US012086972B2

(12) United States Patent
Sundar et al.

(10) Patent No.: US 12,086,972 B2
(45) Date of Patent: Sep. 10, 2024

(54) OPTIMIZING MEMORY READS WHEN COMPUTING VIDEO QUALITY METRICS

(71) Applicant: Meta Platforms, Inc., Menlo Park, CA (US)

(72) Inventors: Deepa Palamadai Sundar, Sunnyvale, CA (US); Visalakshi Vaduganathan, Fremont, CA (US); Harikrishna Madadi Reddy, San Jose, CA (US)

(73) Assignee: META PLATFORMS, INC., Menlo Park, CA (US)

( * ) Notice: Subject to any disclaimer, the term of this patent is extended or adjusted under 35 U.S.C. 154(b) by 0 days.

(21) Appl. No.: 17/394,268

(22) Filed: Aug. 4, 2021

(65) Prior Publication Data
US 2022/0046254 A1 Feb. 10, 2022

Related U.S. Application Data

(60) Provisional application No. 63/061,692, filed on Aug. 5, 2020.

(51) Int. Cl.
*G06T 7/00* (2017.01)
*G06F 12/0875* (2016.01)
(Continued)

(52) U.S. Cl.
CPC ........ *G06T 7/0002* (2013.01); *G06F 12/0875* (2013.01); *G06F 12/0897* (2013.01);
(Continued)

(58) Field of Classification Search
CPC . H04N 19/117; H04N 19/182; G06F 12/0897
See application file for complete search history.

(56) References Cited

U.S. PATENT DOCUMENTS 6,262,748 B1 7/2001 Deering et al.
9,325,985 B2 4/2016 Kolarov et al.
(Continued)

FOREIGN PATENT DOCUMENTS

CN 111432207 11/2020
WO 2012122209 9/2012

OTHER PUBLICATIONS

Cacciotti M., et al., "Hardware Acceleration of HDR-Image Tone Mapping on an FPGA-CPU platform through High-Level Synthesis," 31st IEEE International System-on-Chip Conference (SOCC), 2018, 5 pages.
(Continued)

*Primary Examiner* — Dave Czekaj
*Assistant Examiner* — Shanika M Brumfield
(74) *Attorney, Agent, or Firm* — Mannava & Kang, P.C.

(57) ABSTRACT

Techniques to optimize memory reads when computing a video quality metric are disclosed. In some embodiments, an application-specific integrated circuit for computing video quality metrics includes a set of caches configured to store neighbor pixel data for edge width searches of pixels comprising a frame of a video being analyzed for a video quality metric and a kernel configured to receive corresponding neighbor pixel data for pixels comprising a current processing block of the frame from a subset of the set of caches and simultaneously perform edge width searches for pixels comprising the current processing block to determine corresponding pixel edge width values used for computing the video quality metric.

11 Claims, 5 Drawing Sheets

(51) Int. Cl.

| | | |
|---|---|---|
| *G06F 12/0897* | (2016.01) | |
| *G06F 17/17* | (2006.01) | |
| *H04N 19/103* | (2014.01) | |
| *H04N 19/117* | (2014.01) | |
| *H04N 19/147* | (2014.01) | |
| *H04N 19/176* | (2014.01) | |
| *H04N 19/182* | (2014.01) | |
| *H04N 19/36* | (2014.01) | |
| *H04N 19/40* | (2014.01) | |
| *H04N 19/523* | (2014.01) | |
| *H04N 21/44* | (2011.01) | |

(52) U.S. Cl.
CPC ........... *G06F 17/17* (2013.01); *H04N 19/103* (2014.11); *H04N 19/117* (2014.11); *H04N 19/147* (2014.11); *H04N 19/176* (2014.11); *H04N 19/182* (2014.11); *H04N 19/36* (2014.11); *H04N 19/40* (2014.11); *H04N 19/523* (2014.11); *H04N 21/44008* (2013.01); *G06T 2207/10016* (2013.01); *G06T 2207/30168* (2013.01)

(56) References Cited

U.S. PATENT DOCUMENTS

| | | | |
|---|---|---|---|
| 10,516,833 B2 | 12/2019 | Zhu et al. | |
| 10,699,396 B2 | 6/2020 | Aydin et al. | |
| 11,089,359 B1 | 8/2021 | Katsavounidis | |
| 2008/0028151 A1* | 1/2008 | Hino | G06F 12/0893 |
| | | | 711/E12.041 |
| 2010/0092100 A1* | 4/2010 | Madnani | G06T 5/003 |
| | | | 382/255 |
| 2010/0149202 A1* | 6/2010 | Yoshikawa | G09G 5/393 |
| | | | 345/557 |
| 2010/0253694 A1* | 10/2010 | Kambegawa | G06T 1/60 |
| | | | 345/557 |
| 2012/0233405 A1* | 9/2012 | Budagavi | G06F 12/0844 |
| | | | 711/E12.016 |
| 2014/0101485 A1 | 4/2014 | Wegener | |
| 2015/0113027 A1 | 4/2015 | Chen et al. | |
| 2017/0150158 A1 | 5/2017 | Jacobson et al. | |
| 2017/0154415 A1 | 6/2017 | Aydin et al. | |
| 2017/0270632 A1* | 9/2017 | Kee | G06T 1/60 |
| 2018/0060278 A1 | 3/2018 | Lin et al. | |
| 2019/0035047 A1 | 1/2019 | Lim et al. | |
| 2019/0190976 A1 | 6/2019 | Chen et al. | |
| 2019/0377548 A1 | 12/2019 | Matsuyama | |
| 2020/0126263 A1 | 4/2020 | Dinh et al. | |

OTHER PUBLICATIONS

Deng S., et al., "VMAF Based Rate-Distortion Optimization for Video Coding," IEEE 22nd International Workshop on Multimedia Signal Processing (MMSP), 2020, 6 pages.

Guo J., et al., "VLSI Architecture of Wavelet Transform Based on Basic Lifting Elements," Proceedings of SPIE, Aug. 31, 2009, vol. 7455, pp. 74550E-1-74550E-9.

International Search Report and Written Opinion for International Application No. PCT/US2021/044621, mailed Nov. 24, 2021, 12 pages.

Liu T., et al., "Real-Time Video Quality Monitoring," EURASIP Journal on Advances in Signal Processing, 2011, 2011:122, 18 pages.

Mittal S., "A Survey of Techniques for Approximate Computing," ACM Computing Surveys, Mar. 2016, vol. 48, No. 4, Article 62, pp. 62:1-62:33.

Moschetti F., "A Statistical Approach to Motion Estimation," Ecole Polytechnique Federale De Lausanne (EPFL), 2001, 153 pages.

Moschetti F., et al., "A Statistical Adaptive Block-Matching Motion Estimation," IEEE Transactions on Circuits and Systems for Video Technology, vol. 13, No. 4, Apr. 2003, pp. 417-431.

Ndour G., et al., "Evaluation of Variable Bit-Width Units in a RISC-V Processor for Approximate Computing," Proceedings of the 16th ACM International Conference on Computing Frontiers, Apr. 2019, 7 pages.

Rezazadeh S., et al., "Low-Complexity Computation of Visual Information Fidelity in the Discrete Wavelet Domain," 2010 IEEE International Conference on Acoustics, Speech and Signal Processing, 2010, pp. 2438-2441.

Shingala., et al., "Energy Efficient Perceptual Video Quality Measurement (VMAF) at Scale," Proceedings of SPIE, Applications of Digital Image Processing XLIII, vol. 11510, Aug. 21, 2020, 9 pages.

Sundar D.P., et al., "Hardware Acceleration of Video Quality Metrics," Applications of Digital Image Processing XLIII, vol. 11510, Aug. 21, 2020, 9 pages.

Tran H.T.T., et al., "A Study on Quality Metrics for 360 Video Communications," IEICE Transactions on Information and Systems, Jan. 2018, vol. E101-D, No. 1, pp. 28-36.

Tvrdik P., et al., "A New Diagonal Blocking Format and Model of Cache Behavior for Sparse Matrices," Parallel Processing and Applied Mathematics (PPAM), 2005, pp. 164-171.

Wan P., et al., "Using Diagonal and Horizontal Vertical Sobel Operators Spam Detection," Third International Conference on Intelligent Networking and Collaborative Systems, 2011, pp. 396-400.

Wielgosz M., et al., "FPGA Implementation of Procedures for Video Quality Assessment," Computer Science, 2018, vol. 19, No. 3, pp. 279-305.

Xilinx: "AXI Video Direct Memory Access v6.3: LogiCORE IP Product Guide," Vivado Design Suite PG020, Oct. 4, 2017, 90 pages.

Xu Y., et al., "Fast Implementation of Image Structural Similarity Algorithm," IOP Conference Series: Materials Science and Engineering, 2019, vol. 533, 7 pages.

Zhang Y., et al., "A Subjective Quality Assessment Database for Mobile Video Coding," IEEE Conference on Multimedia Information Processing and Retrieval (MIPR), 2020, pp. 225-228.

Zhong X., et al., "Efficient Lifting Based CDF9/7 Wavelet Transform Using Fixed Point," 3rd International Congress on Image and Signal Processing, 2010, pp. 3094-3097.

ZIPcores: "XY_SCALER Digital Video Scaler IP Core," 2017, Rev. 3.0, 6 pages.

International Preliminary Report on Patentability for International Application No. PCT/US2021/044621, mailed Feb. 16, 2023, 10 pages.

\* cited by examiner

OPTIMIZING MEMORY READS WHEN COMPUTING VIDEO QUALITY METRICS

CROSS REFERENCE TO OTHER APPLICATIONS

This application claims priority to U.S. Provisional Patent Application No. 63/061,692 entitled HARDWARE ACCELERATION OF VIDEO QUALITY METRICS filed Aug. 5, 2020 which is incorporated herein by reference for all purposes.

BACKGROUND OF THE INVENTION

Video transcoding systems rely on video quality metrics for determining optimal video resolutions to serve to end user devices. Video quality metrics in existing video transcoding systems have mostly been implemented in software and have been limited to less computationally complex algorithms so that system resources are not overburdened. Thus, there exists a need for techniques to energy efficiently compute complex video quality metrics in video transcoding systems that provide better measures of transcoded video quality at low power.

BRIEF DESCRIPTION OF THE DRAWINGS

Various embodiments of the invention are disclosed in the following detailed description and the accompanying drawings.

DETAILED DESCRIPTION

Figure 1:
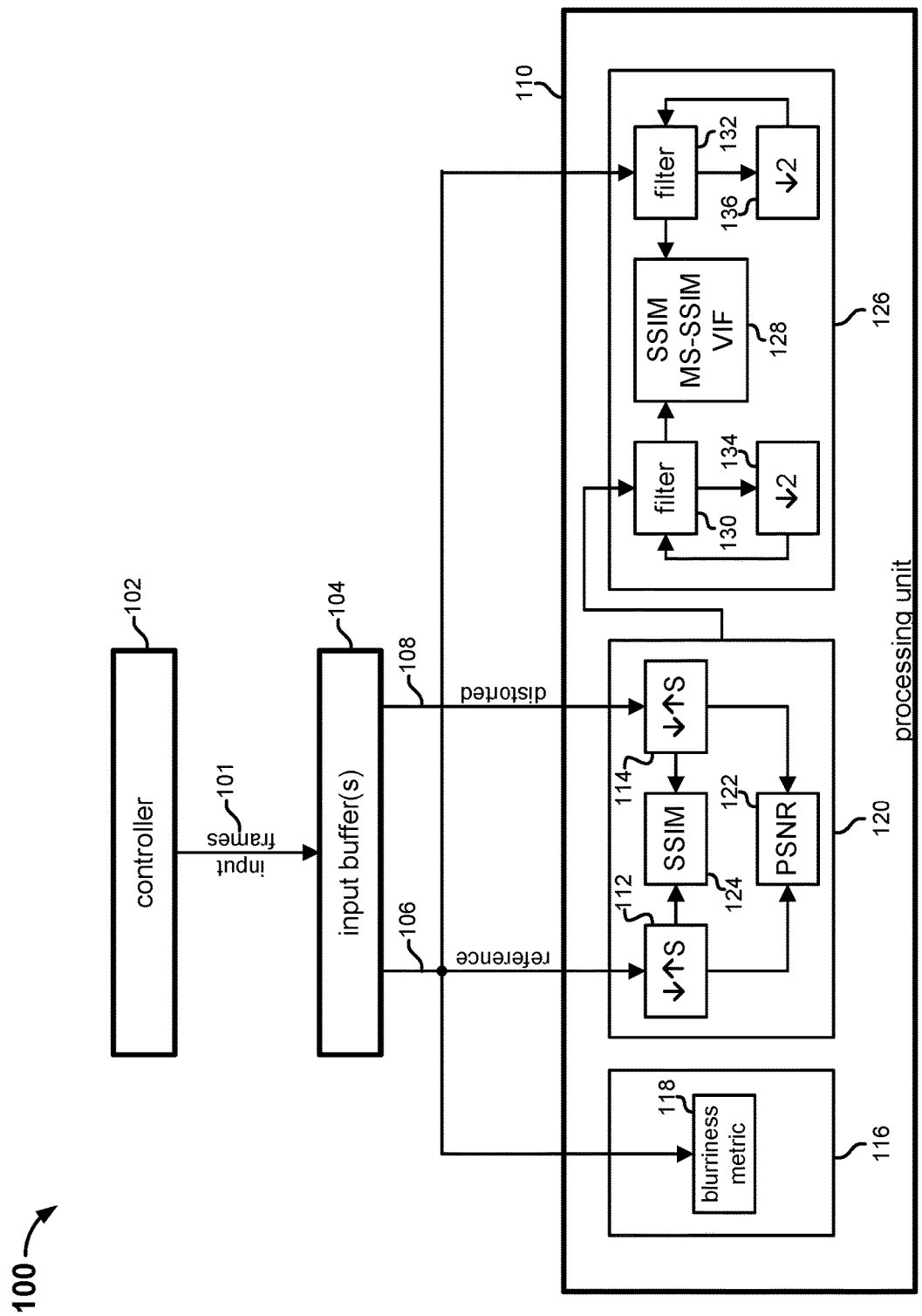
FIG. 1 is a high level block diagram illustrating an embodiment of an accelerator architecture for accelerating computations of objective video quality metrics.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

With the advancement of digital media and growing demand for video content, video transcoding has become a common operation in data centers. Generally, video transcoding is the process of generating multiple versions of the same video in different resolutions or sizes. More specifically, a video transcoder typically comprises processing steps including receiving an input video, decoding the input video, and re-encoding the decoded input video into a plurality of qualities or resolutions (e.g., 360p, 480p, 720p, 1080p, 4K, etc.) that are persisted server-side so that optimal versions of the video may be selected and provided to different devices based on corresponding viewport sizes and/or available communication bandwidths. Transcoding an input video into a prescribed resolution may result in some quality loss in the resulting encoded video having the prescribed resolution. Moreover, scaling the encoded video having the prescribed resolution to different viewport sizes may result in further quality loss.

Quality metrics comprise a manner for measuring or quantifying quality losses resulting from transcoding an input video into an encoded video having a prescribed resolution and/or from scaling the encoded video having the prescribed resolution to a prescribed viewport size. Video transcoding applications rely on quality metrics to select an optimal version of a video for an end user device based on current capabilities of the device for receiving and displaying the video. Thus, quality metrics are determined for each of a plurality of encoded video resolutions for each of a plurality of viewport resolutions so that corresponding quality scores may be employed to select and provide an appropriate version of a video to an end user device.

Quality metrics may generally be divided into two categories—subjective quality metrics and objective quality metrics. Subjective quality metrics are determined via human test subjects, e.g., by asking users for their ratings or scores. Objective quality metrics are determined via mathematical models that facilitate computation of corresponding quality scores or values. For example, Peak Signal-to-Noise Ratio (PSNR) comprises a simple computation based on summing squared errors that has widely been used as an objective pixel quality metric. While subjective quality metrics provide better measures of true perceptual quality, determining such metrics is not scalable or even feasible for most applications. As such, several perception-based objective quality metrics have been proposed in recent years that have been correlated to human perception during testing and have evolved to closely represent subjective video quality. Examples of such perception-based objective quality metrics include Structural Similarity Index Measure (SSIM), Multi-Scale SSIM (MS-SSIM), Visual Information Fidelity (VIF), Video Multimethod Assessment Fusion (VMAF), Detail Loss Metric (DLM), etc.

Objective quality metrics are very resource intensive since computations are performed for each pixel for each frame of a video. Moreover, computational complexity increases with increasing resolutions since computations have to be performed for more pixels. Furthermore, live applications require dynamic computations of quality metrics in real time that need to be performed without introducing significant latency. Objective quality metrics have traditionally been implemented in software, and typically only less computationally complex metrics (such as PSNR and single scale SSIM) have been employed to minimize resource consumption in an associated system. However, more computationally complex objective quality metrics offer opportunities for better quality measurements that provide more accurate indications of perceived video quality. A hardware accelerator dedicated to efficiently computing objective quality metrics is disclosed herein that provides support for not only simpler objective quality metrics that have traditionally been implemented in software but also for more computationally complex emerging objective quality metrics that have been proposed in literature and limited to use cases that do not have resource and/or time constraints but that have yet to receive adoption in video transcoding systems due to heretofore introducing unacceptable resource overheads.

FIG. 1 is a high level block diagram illustrating an embodiment of an accelerator 100 for accelerating computations of objective video quality metrics. Accelerator 100 comprises an application-specific integrated circuit for computing one or more video quality metrics and supports simultaneously computing multiple video quality metrics in parallel. Various components comprising the architecture of accelerator 100 are scalable for parallel processing based on area and power budgets available with respect to an associated system. Accelerator 100 may comprise a stand-alone component or a component of a system or device. For example, accelerator 100 may comprise an independent component of a video transcoding system that offloads resource intensive video quality metrics computations from a central processing unit of the transcoding system.

A simplified block diagram of components comprising an embodiment of accelerator 100 is illustrated in FIG. 1 for the purpose of explanation. However, generally, accelerator 100 may comprise any other appropriate combination and configuration of components to achieve the described functionality. Although many of the examples described herein are with respect to computing quality metrics for frames of a transcoded video, the disclosed techniques may be employed to compute quality metrics for any type of image data comprising pixels.

Video quality measurements may be categorized into full reference metrics, partial reference metrics, and no reference metrics. For a full reference metric, a complete reference image is available to compute distorted image quality. For a partial reference metric, partial information of a reference image such as a set of associated parameters is available to compute distorted image quality. For a no reference metric, no reference image is available, and the metric is used to establish source or upload quality. An accelerator for computing video quality metrics may generally be configured to support any combination of one or more full, partial, and/or no reference metrics. In the example of FIG. 1, accelerator 100 is specifically configured to support a plurality of full reference metrics as well as a no reference metric. A full reference metric comprises comparing a reference frame and a distorted frame on a per pixel or pixel block basis to predict perceptual quality of the distorted frame with respect to the reference frame. A reference frame comprises an original source frame prior to transcoding while a distorted frame comprises an encoded version of the reference frame after transcoding. A quality score is computed per pixel for a frame. Quality scores of pixels comprising a frame are accumulated or combined to generate a frame level score and/or a block level score for a portion of the frame. Block level scores may be useful in identifying regions of a frame that have higher impact on quality. Computed frame level and/or block level scores may be written to memory so that they are available to other components of an associated transcoding system. In some cases, frame level scores of frames comprising a prescribed video are later combined in an appropriate manner to generate a quality score for the video.

In FIG. 1, controller 102 of accelerator 100 facilitates obtaining input video frame data 101. More specifically, controller 102 of accelerator 100 facilitates obtaining frame data 101 from memory or from one or more intermediary components thereof. For example, in one embodiment, controller 102 communicates, e.g., via a double data rate (DDR) channel, with a direct memory access (DMA) interface that interfaces with physical memory. Controller 102 facilitates reading both reference frame data and distorted frame data from memory. Controller 102 furthermore coordinates or synchronizes reads of reference and distorted frame pairs to ensure that read portions of both frames are spatially aligned when input into accelerator 100 so that reference and distorted frame pairs can later be processed on a pixel by pixel basis when computing video quality metrics. Generally, optimally reading data from memory is desirable since memory bandwidth in an associated system is both a limited and expensive resource in terms of power. By supporting computations of multiple metrics simultaneously, accelerator 100 avoids the need to read the same frame multiple times from memory for different metrics, thus more optimally utilizing both bandwidth and power in an associated system.

Read input frame data 101 is loaded into one or more local input buffers 104. In some embodiments, input buffer 104 is configured in a ping pong buffer configuration in which one buffer partition is populated with data read from memory while data comprising another buffer partition is read for processing so that memory read latency can be hidden. Frame data 101 is read from memory by controller 102 and written into input buffer 104 in units of a prescribed input block size. The block size may be based on the size of input buffer 104 and/or a bandwidth supported by a corresponding on-chip network. In some embodiments, pixel blocks comprising a frame are read from memory in a raster scan order, i.e., from left to right and from top to bottom of the frame. Moreover, pixel data comprising a frame may furthermore be decoupled into luminance (luma) and interleaved chrominance (chroma) components. Accelerator 100 may generally be configured to operate on either or both the luminance and chrominance planes, which may be segregated and processed by accelerator 100 in a prescribed order and/or which may be processed in multiple passes by accelerator 100 with each plane read and processed separately.

Reference frame data 106 and distorted frame data 108 stored in buffer memory 104 are read by and input into processing unit 110. That is, a portion of reference frame 106 and a corresponding portion of distorted frame 108 that each comprise a prescribed processing block size are input into processing unit 110 for processing. Processing unit 110 comprises the core processing kernel of accelerator 100. Processing unit 110 is configured to compute a plurality of video quality metrics or scores based on input frame pixel data. More specifically, processing unit 110 is configured to compute a plurality of different perception-based video quality metrics for distorted frame 108 with respect to reference frame 106. Furthermore, processing unit 110 may be configured to compute one or more other types of video quality metrics such as a PSNR metric for distorted frame 108 with respect to reference frame 106 and/or a no reference metric for reference frame 106 that indicates source or upload quality prior to transcoding. In some embodiments, processing unit 110 is configured to simultaneously compute a plurality of video quality metrics in parallel. For example, in one embodiment, processing unit 110 is configured to simultaneously compute up to three video quality metrics including a no reference quality metric, a PSNR metric, and one of a plurality of supported perception-based video quality metrics. In such cases, a selected one of a plurality of supported perception-based video quality metrics that processing unit 110 is currently configured to compute may be specified via a programming interface associated with accelerator 100. Generally, accelerator 100 may be dynamically programmed to compute any one or more supported video quality metrics and may be programmed differently for different input frames.

Video quality metrics are typically determined for a plurality of different viewport resolutions for each encoded resolution. Thus, in many cases, frame data is first scaled to a desired viewport resolution, and then video quality metrics are computed on the scaled output. Processing unit 110 comprises a plurality of programmable inline scaling units for scaling reference and distorted frame data to desired resolutions prior to computing one or more video quality metrics. More specifically, processing unit 110 comprise scaling unit 112 for scaling reference frame data 106 and scaling unit 114 for scaling distorted frame data 108. Each scaling unit may be dynamically programmed to a prescribed scaling mode (e.g., upscale, downscale, bypass) and scaling ratio or factor via an associated programming interface. Scaled outputs are not stored in memory but rather directly input into one or more processing kernels for on the fly inline computations of corresponding video quality metrics. By providing inline scaling, the architecture of accelerator 100 facilitates more efficient memory bandwidth usage in an associated system by eliminating the need to write and read scaled outputs to and from memory. Scaling units 112 and 114 may comprise any appropriate programmable scaler configurations that, for example, do not introduce any further or at least any significant quality loss during the scaling process.

Scaled frame data is processed by one or more compute kernels that are each configured to compute one or more video quality metrics. In the embodiment of FIG. 1, processing unit 110 comprises three separate hardware partitions, each with one or more kernels. The various kernels comprising processing unit 110 implement fixed point versions of the quality metrics algorithms they are configured to implement. That is, floating point operations specified with respect to the original algorithms are appropriately modified to fixed point equivalents for efficient hardware implementation. The various components comprising processing unit 110 are scalable. That is, processing unit may be extended to include any number of threads of scaling unit pairs and compute kernels so that a plurality of viewport resolutions may be computed in parallel, which effectively facilitates reducing the number of passes needed to compute scores for all viewport resolutions and, in turn, the number of times input frames need to be read from memory. Various details of the specific embodiment of processing unit 110 illustrated in FIG. 1 are next described to provide an example of a manner in which processing unit 110 may be configured. However, generally, processing unit 110 may comprise any other appropriate combination and configuration of components to achieve the described functionalities.

In the embodiment of FIG. 1, partition 116 of processing unit 110 is configured to compute a no reference metric that is used to establish source quality of an input reference frame. In the given example, kernel 118 comprising partition 116 is configured to compute a blurriness metric. Kernel 118 may comprise a plurality of stages. For example, in one embodiment, input reference frame data 106 is smoothened using a Gaussian blur filter in a first stage, the smoothened output from the first stage is input into a Sobel filter to compute pixel gradients in a second stage, and the output of the second stage is input into a third stage that determines edge width values associated with the spread of the edge of each pixel, which are then used to compute final blur scores.

Partition 120 of processing unit 110 comprises kernel 122 and kernel 124. Kernel 122 is configured to compute a PSNR (sum of squared errors) metric with respect to input reference and distorted frame data. Kernel 124 is configured to compute SSIM, for example, using an FFMPEG based algorithm, which comprises an overlapped 8×8 approximation algorithm. In SSIM, three components—luminance (L), contrast (C), and structure (S)—based on local means, standard deviations, and cross-covariance of reference and distorted frame data are computed and combined to obtain an overall similarity measure, i.e., SSIM index.

Partition 126 of processing unit 110 comprises kernel 128. Kernel 128 comprises a unified kernel configured to compute single-scale (LIBVMAF) SSIM, multi-scale SSIM, as well as VIF and may be programmed to compute any one of the aforementioned metrics for a given input frame. In partition 126, distorted and reference frame data is first filtered via filter 130 and filter 132, respectively, which in some cases comprise smoothening Gaussian blur filters. The smoothened frame data output by filters 130 and 132 is then input into kernel 128 which is configured to compute LCS values of SSIM. For single scale SSIM, e.g., that is computed using an LIBVMAF based algorithm, input pixels are sent once through kernel 128. For MS-SSIM, the smoothened outputs of both frames are sent through corresponding dyadic down samplers 134 and 136 and looped back to kernel 128 to process higher scales. This process may be iterated up to a prescribed number of times corresponding to a maximum number of scales or levels supported. The feedback paths of partition 126 facilitate reuse of the same hardware to compute all scales or levels. Kernel 128 is furthermore configured to compute VIF and supports logarithmic operations needed to compute VIF scores.

As previously described, a no reference metric comprises an objective quality metric for determining quality when a reference frame is not available and is typically employed to determine original source or upload quality, i.e., blurriness. No reference metric algorithms compute a blur score for a frame and/or for one or more pixels thereof.

Figure 2:
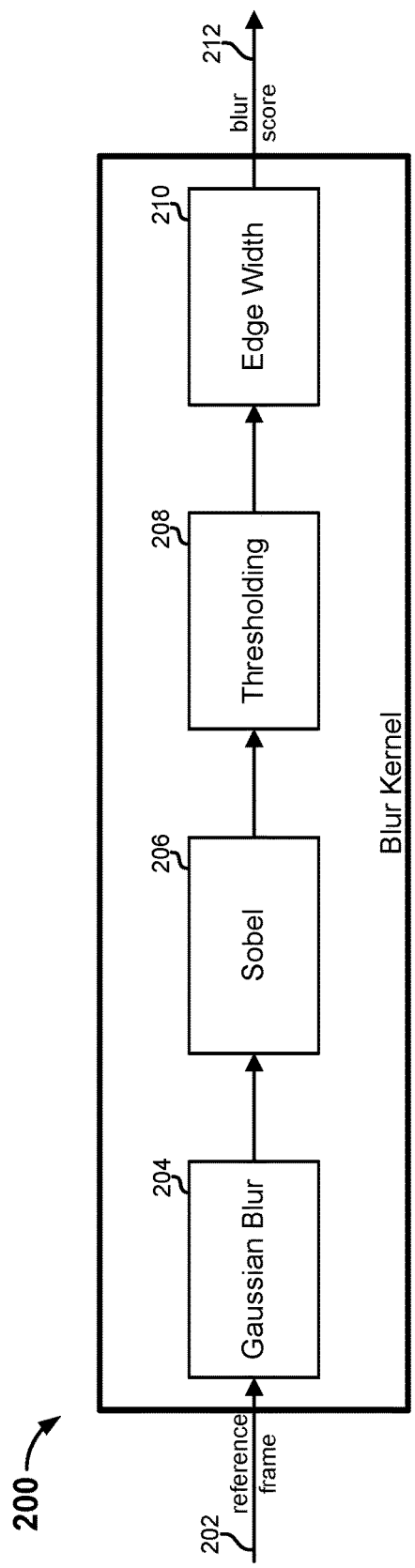
FIG. 2 is a high level block diagram illustrating an embodiment of a kernel configured to compute a blurriness metric.

FIG. 2 is a high level block diagram illustrating an embodiment of a kernel configured to compute a blurriness metric. In some embodiments, blur kernel 200 of FIG. 2 comprises compute kernel 118 of FIG. 1. As depicted, reference frame data 202 is input into stage 204. Stage 204 comprises a filter configured to smoothen and remove noise from input reference frame data 202. In the given example, stage 204 comprises a Gaussian blur filter. The output of stage 204 is input into stage 206. Stage 206 comprises a filter configured to determine edges in the smoothened frame data. The edges determined in stage 206 comprise edges of objects comprising the frame. In the given example, stage 206 comprises a Sobel operator configured to compute pixel gradient vectors that indicate search directions for pixel edge width computations. The output of stage 206 is input into stage 208. Stage 208 is configured to perform one or more appropriate thresholding operations. For example, in one embodiment, stage 208 is used to perform processing associated with retaining maximum gradients and suppressing the rest and/or identifying strong and weak edges, e.g., using a double threshold technique. The output of stage 208 is input into stage 210. Stage 210 is configured to compute edge width or spread values used for computing a blurriness metric. More specifically, stage 210 is configured to perform edge width searches with respect to neighbor pixels, e.g., in the search directions determined at stage 206, to compute edge width or spread values of one or more pixels currently being processed to compute corresponding blur scores. The output of stage 210 comprises one or more associated blur scores 212. In various embodiments, blur score 212 may comprise one or more pixel level scores, one or more pixel block level scores, and/or a frame level score. Blur scores may be computed for all frame pixels except pixels comprising actual frame edges or boundaries for which adequate neighbor pixel data does not exist. Blur score 212 output by kernel 200 may be written into an external main memory of an associated system for use by other system components.

Figure 3:
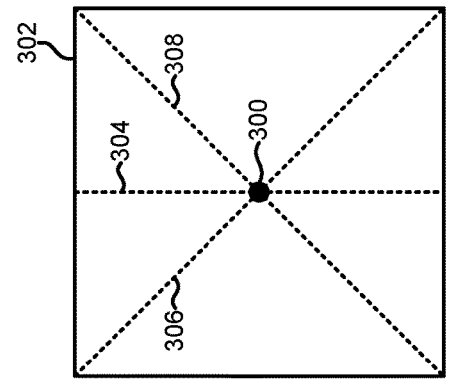
FIG. 3 illustrates an embodiment of a search window.

To compute an edge width or spread of a given pixel, a search with respect to neighbor pixels is performed in a prescribed search direction for a prescribed search window size. FIG. 3 illustrates an embodiment of a search window. Pixel 300 comprises a current pixel for which an edge width is being computed. An edge width search for pixel 300 is performed within search window 302 in a prescribed search direction. Three example search directions are illustrated with respect to search window 302: vertical search direction 304, diagonal (45 up) search direction 308, and diagonal (45 down) search direction 306. One of a plurality of supported search directions is selected for a given pixel 300, e.g., based on gradients of the pixel determined at stage 206 of FIG. 2. In the given example, search window 302 is of size N×N pixels, which indicates N neighbor pixels up and N neighbor pixels down the selected search direction of pixel 300 are processed or searched to determine the edge width or spread of pixel 300.

As is apparent from FIG. 3, an edge width search for a single pixel requires availability of many neighbor pixels. Pixels of a frame are typically stored in memory in a linear format, e.g., row by row. Given such a storage format, a diagonal search is not very efficient since several memory read operations need to be performed to load all neighbor pixels involved in the search. Repeatedly reading the same pixels from main memory multiple times not only consumes significant bandwidth and power of an associated system but also introduces significant latency. Thus, techniques for more efficiently handling pixel read operations during blurriness metric computations are needed. In some embodiments, a dedicated set of local memories or caches is employed for buffering pixels for edge width searches. As further described below, pixel data for edge width searches is stored in the set of caches in a manner that facilitates reusing read data and reducing multiple reads of the same data, e.g., from main memory and/or from the caches themselves. Moreover, pixels are stored and processed in units of a prescribed block size for further efficiency. The disclosed techniques are especially useful for more efficiently conducting diagonal searches during edge width computations. In some embodiments, for example, the disclosed techniques facilitate reading the same pixel data only once from external memory, reading the same pixel data only once from a larger local cache, and reducing a number of reads of the same pixel data from smaller local caches by reusing data loaded from the smaller caches into local flip flops while performing edge width searches.

Figure 4:
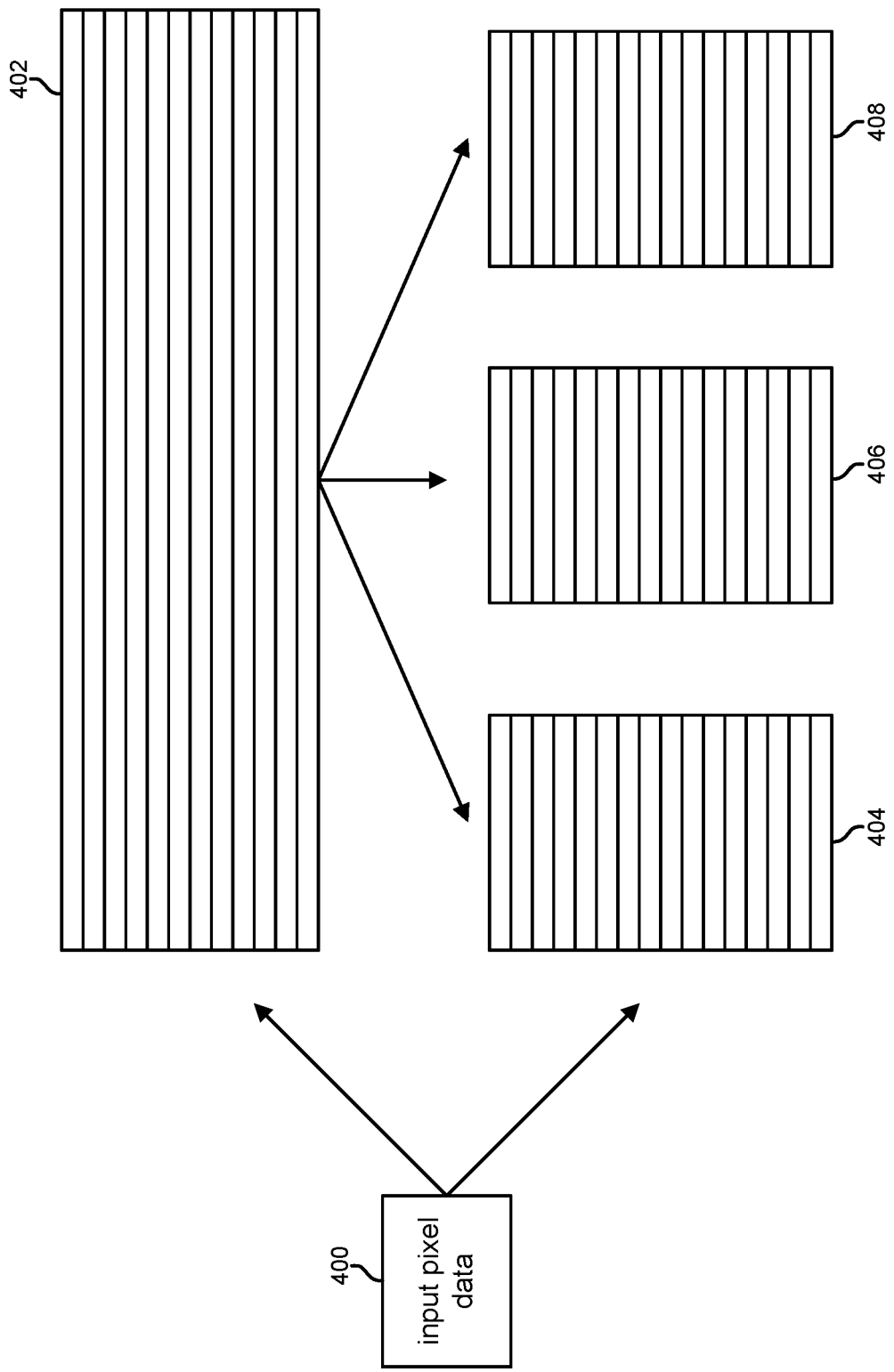
FIG. 4 is a high level block diagram illustrating an embodiment of a set of local caches configured to store pixel data for edge width searches when computing blurriness metrics.

FIG. 4 is a high level block diagram illustrating an embodiment of a set of local caches configured to store pixel data for edge width searches when computing blurriness metrics. The set of local caches may comprise hardware partition 116 of FIG. 1 and may be employed by kernel 118 of FIG. 1 or kernel 200 of FIG. 2. The set of caches in the embodiment of FIG. 4 comprises a larger first level cache 402 and a plurality of smaller second level caches 404-408 associated with different search directions. In one example, directional cache 404 is configured to store left neighbors, directional cache 406 is configured to store vertical neighbors, and directional cache 408 is configured to store right neighbors. In some embodiments, each of caches 402-408 comprises a circular buffer memory. Input pixel data 400 is written into both first level cache 402 (e.g., as future top neighbors) and directional caches 404-408 (e.g., as current bottom neighbors). Input pixel data 400 may be received, for example, from stage 204 of kernel 200 of FIG. 2. In such cases, smoothened pixel data 400 output by Gaussian blur filter 204 of FIG. 2 is loaded into caches 402-408 for edge width processing.

First level cache 402 is configured to store a plurality of rows of pixel data comprising future neighbors and future processing blocks. Thus, first level cache 402 is used to buffer input pixel data 400 for future processing. In some embodiments, the future neighbors stored in first level cache 402 comprise future top neighbors. First level cache 402 comprises a larger size relative to a smaller size of each of second level directional caches 404-408. Thus, access to larger first level cache 402 consumes more power than access to smaller second level directional caches 404-408. For better power efficiency, in some embodiments, the same data is written into and read from first level cache 402 only once while the same data may be written into and read from second level directional caches 404-408 multiple times.

Each of second level directional caches 404-408 is configured to store a plurality of rows of pixel data comprising current neighbors of pixels comprising a current processing block for different search directions. Thus, pixel data stored in second level directional caches 404-408 is read by a compute kernel during edge width processing of a current processing block. Multiple or all of second level directional caches 404-408 may be simultaneously read in parallel so that the compute kernel may simultaneously perform edge with searches for pixels comprising a current processing block in parallel for a plurality of different search directions. In second level directional caches 404-408, top rows comprise top neighbors, a current processing block comprises a middle row, and bottom rows comprise bottom neighbors. Top neighbors and a current processing row are preloaded into second level directional caches 404-408 from first level cache 402 while bottom neighbors are loaded from incoming input pixel data 400. Edge width processing for a current processing block may be commenced as soon as corresponding neighbor pixel data has been populated in second level directional caches 404-408.

As previously mentioned, data is stored and processed in units of a prescribed block size for further read efficiency. A pixel block may generally comprise a current processing block or a current or future neighbor block. Efficiently managing pixel blocks facilitates reducing read operations of the same pixel block multiple times as the pixel block switches roles during edge width computations of being a current processing block, top neighbor block, bottom neighbor block, left neighbor block, and/or right neighbor block. In some embodiments, using a prescribed pixel block size as well as a prescribed pixel block processing order facilitates reducing directional cache read operations. In some such cases, neighbor pixel data from directional caches 404-408 that is loaded into local registers or flip flops is reused for multiple processing blocks comprising a current processing row, thus eliminating at least some repeated read operations of the same data from directional caches 404-408.

Figure 5:
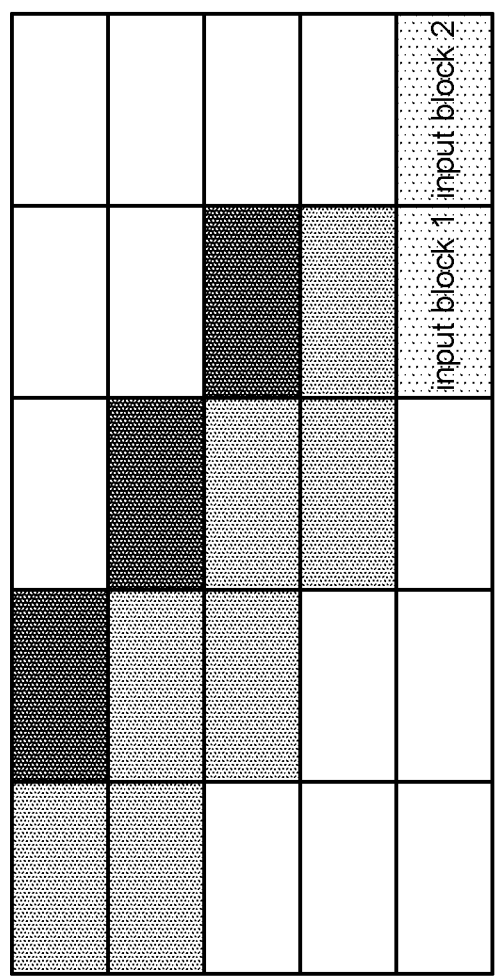
FIG. 5 is a high level block diagram illustrating an embodiment of a manner in which pixel data may be reused for a diagonal search.

FIG. 5 is a high level block diagram illustrating an embodiment of a manner in which pixel data may be reused for a diagonal search. In the example of FIG. 5, each rectangle comprises a pixel block of a prescribed block size. In some embodiments, the prescribed block size comprises a 4×4 pixel block. In such cases, data is written into and read from local caches in 4×4 pixel blocks, and edge width computations are performed for 4×4 pixel blocks. In the example of FIG. 5, 4×4 pixel blocks are processed in a raster scan order to facilitate reuse of pixel data loaded into local registers or flops. Such a scheme is particularly useful for diagonal search directions, which otherwise would require repeated reads of the same data from the directional caches. FIG. 5 specifically illustrates a manner in which top neighbor pixel blocks are reused with respect to a 45 up diagonal search direction. In the given example, pixel blocks having lighter fill comprise common neighbors which when loaded into local flops for input block 1 may be reused for input block 2. Thus, while processing input block 2, only pixel blocks having darker fill are loaded into local flops from directional caches, thus saving re-reads of pixel blocks having lighter fill from the directional caches. Neighbor pixel blocks may be similarly reused for other diagonal search directions. In this example, all neighbors of a first pixel block of a given row are preloaded into flops, but neighbors are reused for all other pixel blocks of the given row as described with respect to FIG. 5.

Figure 6:
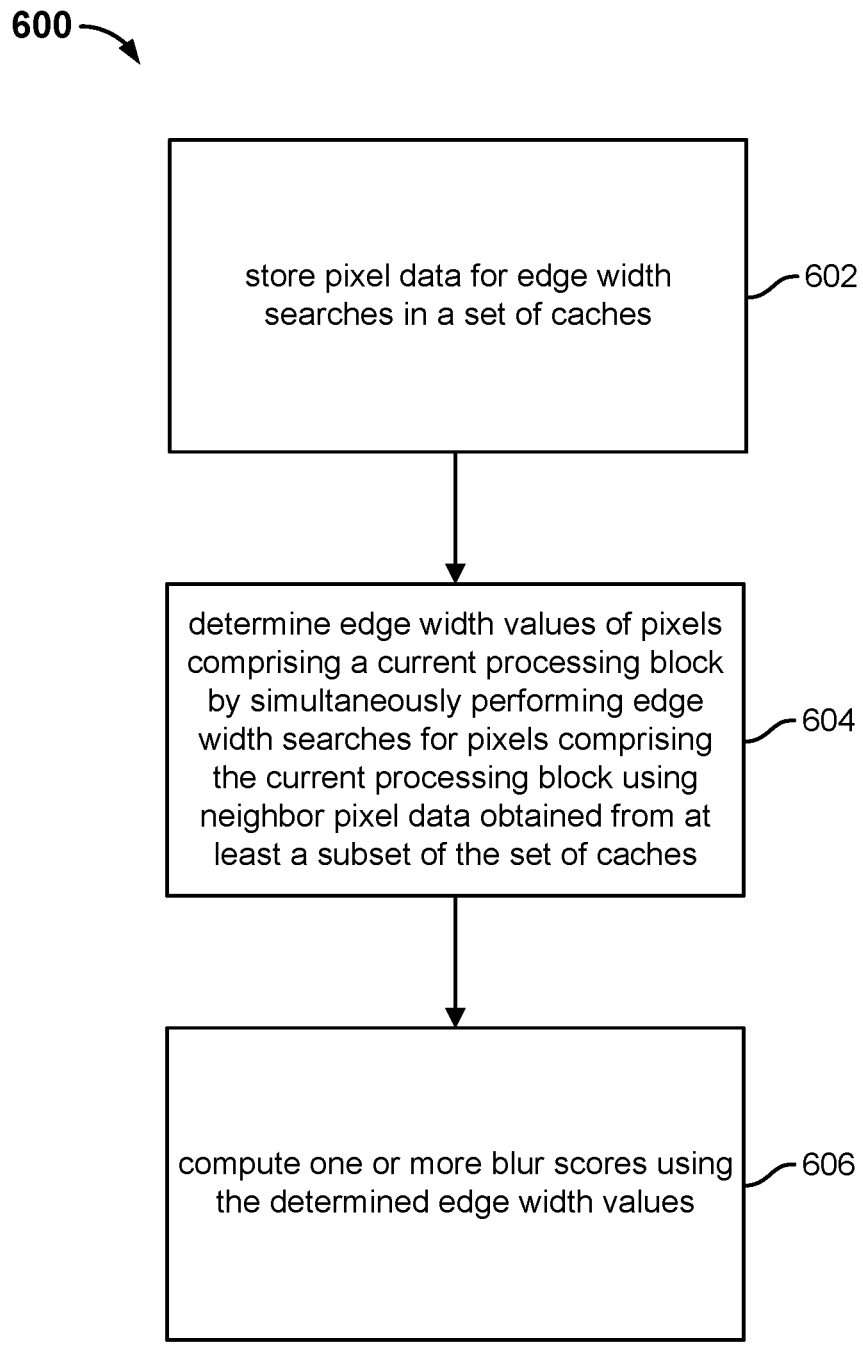
FIG. 6 is a high level flow chart illustrating an embodiment of a process 600 for computing blur scores.

FIG. 6 is a high level flow chart illustrating an embodiment of a process 600 for computing blur scores. In some embodiments, process 600 of FIG. 6 is employed by kernel 118 of FIG. 1 or kernel 200 of FIG. 2. Process 600 starts at step 602 at which pixel data for edge width searches is stored in a set of caches. At step 604, edge width values of pixels comprising a current processing block are determined by simultaneously performing edge width searches for pixels comprising the current processing block using neighbor pixel data obtained from at least a subset of the set of caches. At step 606, one or more blur scores are computed using the edge width values determined at step 604. Process 600 subsequently ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a set of caches of an application-specific integrated circuit configured to store neighbor pixel data for edge width searches of pixels comprising a frame of a video being analyzed for source video quality, comprising:
a first level cache to store pixel data comprising future neighbors and processing blocks;
a left neighbor second level directional cache to store left neighbors;
a vertical neighbor second level directional cache to store vertical neighbors; and
a right neighbor second level directional cache to store right neighbors; and
a kernel of the application-specific integrated circuit configured to retrieve corresponding neighbor pixel data for pixels comprising a current processing block of the frame from a subset of the set of caches and simultaneously perform, by processing in parallel, edge width searches in a plurality of search directions, using neighbor data from the first level cache and the second level directional caches in each of the plurality of search directions, for pixels comprising the current processing block to determine corresponding pixel edge width values used for computing a blurriness video quality metric based on pixel spread, wherein a filtering stage comprising the kernel is configured to determine the plurality of edge width search directions.

2. The system of claim 1, wherein the plurality of second level directional caches is configured to at least in part be populated from the first level cache with pixel data comprising at least a subset of a search window of the current processing block.

3. The system of claim 1, wherein the first level cache comprises a larger size relative to a smaller size of the plurality of second level directional caches.

4. The system of claim 1, wherein the kernel is configured to receive corresponding neighbor pixel data simultaneously from two or more of the plurality of second level directional caches.

5. The system of claim 1, wherein the subset comprises one or more of the plurality of second level directional caches.

6. The system of claim 1, wherein the plurality of search directions comprises one or more diagonal search directions.

7. The system of claim 1, wherein the set of caches is populated with output from a filtering stage comprising the kernel that is configured to smoothen frame pixel data prior to edge width searches.

8. A method, comprising:
configuring a set of caches of an application-specific integrated circuit to store neighbor pixel data for edge width searches of pixels comprising a frame of a video being analyzed for source video quality, wherein the set of caches comprises:
a first level cache to store pixel data comprising future neighbors and processing blocks;
a left neighbor second level directional cache to store left neighbors;
a vertical neighbor second level directional cache to store vertical neighbors; and
a right neighbor second level directional cache to store right neighbors; and
configuring a kernel of the application-specific integrated circuit to retrieve corresponding neighbor pixel data for pixels comprising a current processing block of the frame from a subset of the set of caches and simultaneously perform, by processing in parallel, edge width searches in a plurality of search directions, using neighbor data from the first level cache and the second level directional caches in each of the plurality of search directions, for pixels comprising the current processing block to determine corresponding pixel edge width values used for computing a blurriness video quality metric based on pixel spread, wherein a filtering stage comprising the kernel is configured to determine the plurality of edge width search directions.

9. The method of claim 8, wherein the plurality of search directions comprises one or more diagonal search directions.

10. A computer program product embodied in a non-transitory computer readable medium and comprising computer instructions for:
   configuring a set of caches of an application-specific integrated circuit to store neighbor pixel data for edge width searches of pixels comprising a frame of a video being analyzed for source video quality, wherein the set of caches comprises:
   a first level cache to store pixel data comprising future neighbors and processing blocks;
   a left neighbor second level directional cache to store left neighbors;
   a vertical neighbor second level directional cache to store vertical neighbors; and
   a right neighbor second level directional cache to store right neighbors; and configuring a kernel of the application-specific integrated circuit to retrieve corresponding neighbor pixel data for pixels comprising a current processing block of the frame from a subset of the set of caches and simultaneously perform, by processing in parallel, edge width searches in a plurality of search directions, using neighbor data from the first level cache and the second level directional caches in each of the plurality of search directions, for pixels comprising the current processing block to determine corresponding pixel edge width values used for computing a blurriness video quality metric based on pixel spread, wherein a filtering stage comprising the kernel is configured to determine the plurality of edge width search directions.

11. The computer program product of claim 10, wherein the plurality of search directions comprises one or more diagonal search directions.

* * * * *